US006640616B2

(12) United States Patent
Holt

(10) Patent No.: US 6,640,616 B2
(45) Date of Patent: Nov. 4, 2003

(54) APPARATUS AND METHOD FOR DETECTING LEAKS IN METAL ROOFS

(76) Inventor: Jesse E. Holt, 1205 Park Ave., Oneonta, AL (US) 35121

( * ) Notice: Subject to any disclaimer, the term of this patent is extended or adjusted under 35 U.S.C. 154(b) by 0 days.

(21) Appl. No.: 10/091,608

(22) Filed: Mar. 6, 2002

(65) Prior Publication Data

US 2003/0167826 A1 Sep. 11, 2003

(51) Int. Cl.⁷ ............................................... G01M 3/02
(52) U.S. Cl. ................................................. 73/40; 73/46
(58) Field of Search ........................... 73/40, 46, 49.8

(56) References Cited

U.S. PATENT DOCUMENTS

| | | | |
|---|---|---|---|
| 1,371,484 A | * 3/1921 | Howard | 73/40 |
| 3,043,129 A | * 7/1962 | King | 73/40 |
| 3,524,342 A | * 8/1970 | Hobbs | 73/40 |
| 3,982,421 A | * 9/1976 | Wallace | 73/40 |
| 4,565,965 A | 1/1986 | Geesen | |
| 4,598,273 A | 7/1986 | Bryan, Jr. et al. | |
| 4,924,174 A | 5/1990 | Sheahan | |
| 5,080,542 A | 1/1992 | Sheahan | |
| 5,081,422 A | 1/1992 | Shih | |
| 5,317,852 A | 6/1994 | Howland | |
| 5,850,144 A | 12/1998 | Howells et al. | |
| 6,167,666 B1 | 1/2001 | Kelly | |
| 6,175,310 B1 | 1/2001 | Gott | |
| 6,539,776 B2 | * 4/2003 | Davey | 73/40 |

\* cited by examiner

*Primary Examiner*—Daniel S. Larkin
(74) *Attorney, Agent, or Firm*—Charles D. Gunter

(57) ABSTRACT

An apparatus and method are shown for detecting leaks in metal roofs which are made up of metal roof panels secured in position to form a roof structure by metal screws. The apparatus includes an elongate tubular stand having a lower extent and an upper extent connected by an internal bore, the lower extent terminating in a bore end opening. A hand operated pump communicates with the internal bore for supplying positive pressure or drawing a vacuum on the internal bore. The bore end opening is sealed by an elastomeric seal which is used to form a pressure tight seal about one of the metal screw to be tested. A pressure gauge on the stand communicates with the internal bore for measuring a change in pressure within the internal bore, such pressure change being indicative of a leak present at the metal screw being tested.

4 Claims, 2 Drawing Sheets

APPARATUS AND METHOD FOR DETECTING LEAKS IN METAL ROOFS

BACKGROUND OF THE INVENTION

1. Field of the Invention

The present invention relates generally to an improved device for detecting leaks in a metal roof and to the method of use of such a device.

2. Description of the Prior Art

A variety of metal roof systems are in commercial use at the present time. These roof systems are sound in structure, economical to install, are flexible enough to accommodate various thermal and mechanical stresses, and are thermally efficient when combined with blanket insulation or thermal blocks. Certain of the prior art metal roofing systems employed interlocking seams and special mounting clips for joining and positioning the metal roof panels. These systems require a number of different components for assembly and are somewhat labor intensive. A simpler system of construction involves the use of simple mechanical fasteners, such as metal screws, to join and position the metal roof panels. A worker with a power tool can quickly and easily install roofing panels using metal screw fasteners.

Despite the advantages in cost and simplicity of the mechanical fastening systems, problems sometimes exist in that leaks can occur in the vicinity of the metal fastener. Since a large number of mechanical fasteners are used to make up the roof structure, checking for leaks can be a time consuming and tedious procedure. It has sometimes been easier to replace a whole section of roof, rather than check each fastening point for a leak.

A need exists for a simple and economical device for checking a metal roof for leaks, particularly at the point at which mechanical fastening elements are used to join and position the metal roof panels.

A need also exists for such a device which is portable, hand operated, and which is extremely reliable in operation.

SUMMARY OF THE INVENTION

Accordingly, the present invention provides an apparatus for detecting leaks in a metal roof having a plurality of metal roof panels which are secured in position to form a roof structure by mechanical fastening elements. The apparatus includes an elongate tubular stand having a lower extent and an upper extent connected by an internal bore, the lower extent terminating in a bore end opening. A pressurization means is provided which communicates with the internal bore for supplying positive pressure or drawing a vacuum on the internal bore. A seal means, located within the bore end opening, forms a pressure tight seal about a selected one of the mechanical fastening elements used to secure the metal roof panels. A gauge means communicates with the internal bore for measuring a change in pressure within the internal bore, such pressure change being indicative of a leak present at the mechanical fastening element being tested.

The above described apparatus is used in a method for detecting leaks in a metal roof having a plurality of metal roof panels which are secured in position to form a roof structure by metal screws having exposed screw heads once the panels are in place. In the first step in the method, a pressure tight seal is formed about the exposed screw head of a selected one of the metal screws used to secure the metal panels in place on the roof structure by means of the elastomeric seal located in the bore end opening of the apparatus. Either a positive pressure or a vacuum can then be applied to the sealed internal bore. By measuring any change in pressure in the internal bore, the user has an immediate indication of whether a leak is present at the exposed screw head.

Additional objects, features, and advantages will be apparent in the written description which follows.

BRIEF DESCRIPTION OF THE DRAWINGS

To aid understanding of the invention, a preferred form thereof will now be described by way of illustration and with respect to the accompanying drawings, in which.

DETAILED DESCRIPTION OF THE INVENTION

Figure 4:
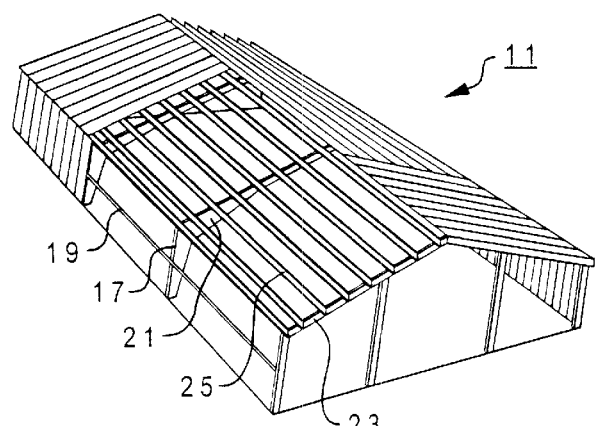
FIG. 4 is a perspective view of a building showing the partially completed metal roof structure.
Figure 5:
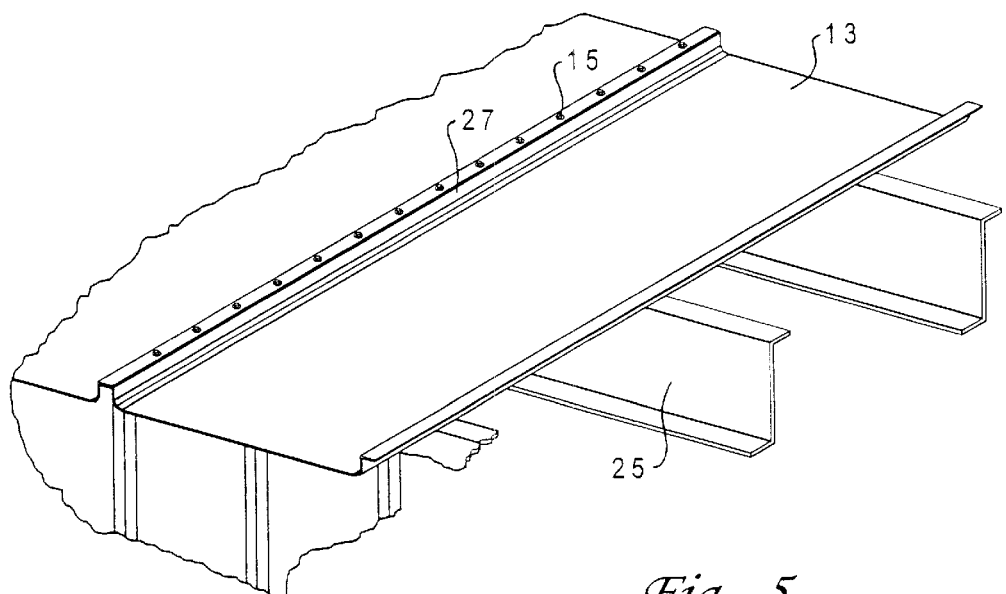
FIG. 5 is a close up, isolated view of a portion of the roof structure of the building of FIG. 4 showing the mechanical fastening elements used to position the respective roof panels.

Turning first to FIG. 4, there is shown a typical metal roofed building 11 under construction. As shown in FIGS. 4 and 5, the building roof structure is comprised of substantially identical panels 13 with opposite sidewalls having flanged edges which are shaped to nest together. The panel edges are then secured in position by means of mechanical fasteners, in this case metal screws having exposed screw heads 15. The particular metal roof structure employed is not critical to the present invention as the invention applies equally well to a variety of metal roof structures employing mechanical fasteners to join and position the metal panels thereof.

As shown in FIG. 4, the metal roofed building 11 may be pre-engineered with panel type side and end walls and internal framing as is conventional in the industry. The framing may include columns 17, girts 19, girders 21, end wall rafters 23, and purlins 25. The purlins 25 support the various panels 13 making up the roof. The panels 13 will extend from the ridge to the eave. The panels used in forming the roof structure are typically identical in cross sectional area and are set up side by side and have upstanding walls which are fitted together to form the seam. As shown in FIG. 5, the metal screws pass through the seam region at regularly spaced intervals.

Figure 1:
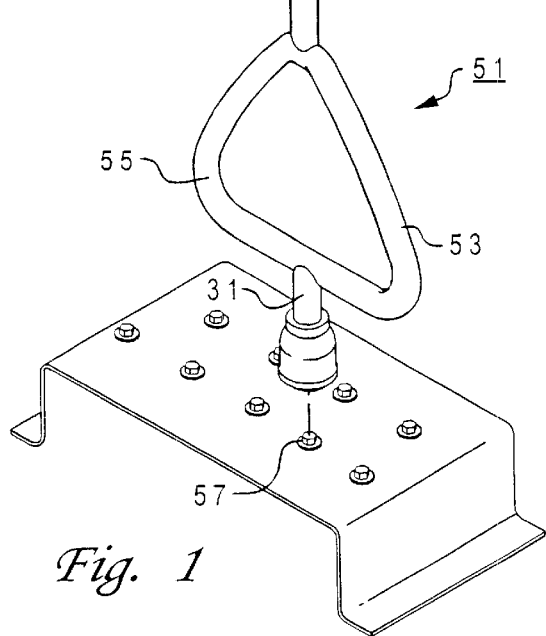
FIG. 1 is a perspective view of the apparatus of the invention showing the device in position to test the exposed screw head of a metal screw used to secure a metal panel in place to form a section of a metal roof.

Turning to FIG. 1, there is shown a preferred apparatus of the invention, designated generally as 12. The apparatus 12 includes an elongate tubular stand 29 having a lower extent 31 and an upper extent 33 connected by an internal bore (35 in FIG. 2). As shown in FIG. 3, the lower extent 31 terminates in a bore end opening 37.

Pressurization means communicate with the internal bore 35 for supplying positive pressure or drawing a vacuum on the internal bore. Preferably, the pressurization means is a hand-operated pump 39 having a plunger element 41 which is used to drive a piston element (not shown) within the internal bore 35 for pressurizing the internal bore. While the device is illustrated in the form of a hand pump for providing positive pressure, it will be appreciated from the discussion which follows that the device could be operated by drawing a vacuum on the internal bore as well.

As shown in FIG. 3, seal means are located within the bore end opening 37 for forming a pressure-tight seal about a selected one of the mechanical fastening elements (screw heads) used to secure the metal roofpanels 13. As shown in FIG. 3, the seal means preferably comprises an elastomeric ring 43 circumscribing the end opening and sized to fit over and surround the mechanical fastener, in this case screw head 57.

Figure 2:
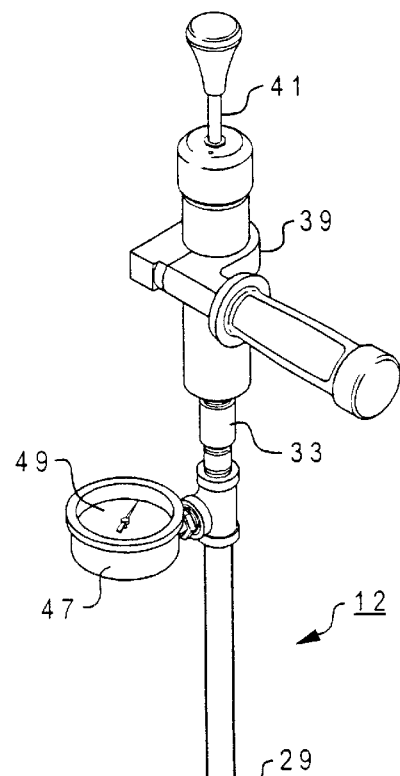
FIG. 2 is a partial, isolated view of the upper extent of the apparatus of FIG. 1 with portions broken away to show the operation of the check valve thereof.
Figure 2:
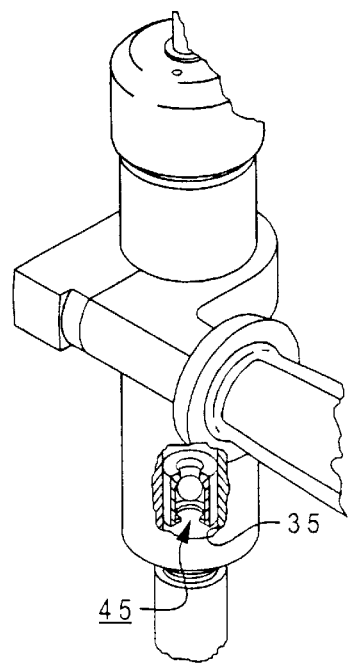
Figure 3:
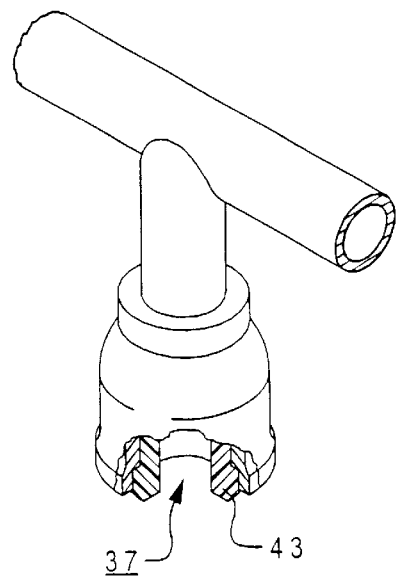
FIG. 3 is a partial, isolated view of the lower extent of the apparatus of FIG. 1 with portions broken away to show the sealing means located within the bore end opening thereof.

As shown in FIG. 2, a check valve 45 is located in the tubular bore 35 between the hand-operated pump 39 with its piston element and a pressure gauge 47. The pressure gauge 47 which is located on the exterior of the tubular stand 29 includes a faceplate 49, which is observable by a user during operation of the hand pump. The pressure gauge constitutes a gauge means communicating with the internal bore 35 for measuring a change in pressure within the internal bore. Such a change in pressure is indicative of a leak present at the mechanical fastening element being tested.

In the embodiment of the device illustrated in FIG. 1, the tubular stand 29 includes a stirrup-shaped region 51 which is connected between the upper extent 33 and the lower extent 31 thereof. In other words, the region 51 resembles the flat-based ring hung from a saddle and used as a foot rest in mounting and riding a horse. The flat-based bottom portion of the ring forms a convenient foot rest for a user in applying a sealing pressure on the lower extent 31 of the device during operation. The stirrup-shaped region 51 forms a pair of oppositely arranged arcuate paths 53, 55 which communicate the internal bore of the upper extent 33 with the internal bore of the lower extent 31 of the apparatus.

In the method for detecting leaks in a metal roof of the invention, the apparatus illustrated in FIG. 1 is used to form a pressure-tight seal about the exposed screw head (57 in FIG. 1) to be tested. This is accomplished by simply lowering the lower extent 31 of the apparatus into position over the screw head 57 and applying positive pressure by stepping on the stirrup region 51 so that the elastomeric sealing means 43 forms an airtight seal about the screw head. The user then applies either a positive pressure or vacuum to the sealed internal bore of the device. In the preferred embodiment, the user applies a positive pressure by stroking the plunger element 41 of the hand-operated pump 39. The check valve 45 located within the internal bore 35 maintains a positive pressure along the length of the stand 29 and communicates the pressure to the region of the bore end opening which is sealed about the screw head 57. The user can then observe the faceplate 49 of the pressure gauge 47 to detect any change in pressure in the internal bore which would represent an indication of a leak present at the exposed screw head 57 being tested. In the preferred embodiment, the hand-operated pump 39 is capable of providing a positive pressure of between about 1 to 5 psi to the internal bore 35. If no leakoff pressure is observed, the device can simply be pulled upward to relieve the pressure within the internal bore and moved to the next mechanical fastening element to be tested.

In the embodiment of the device shown in FIG. 3, the bore end opening 37 and elastomeric ring 43 define a flat circumferential opening which seals against a flat roof surface, such as the flat surface shown in FIG. 1. However, it will also be appreciated that the bore end opening 37 may need to accomadate screws which are present in the top of roof corrugations, such as the corrugations illustrated generally at 27 in FIG. 5. In this case, the bore end opening 37 will be shaped to span or encompass the shape of the screw and corrugation to form a pressure tight seal with these surfaces. To conveniently accomplish this purpose, a variety of interchangeable tips could be provided for attachment to the lower most extent 31 of the device. The interchangeable tips could be a fixed suitable threaded connection to the lower bore end opening 37 to seal against a variety of roof seams and surfaces containing metal screw fasteners.

An invention has been provided with several advantages. The apparatus of the invention is simple in design and economical to manufacture and is extremely reliable in operation. The device features few moving parts which are susceptible to maintenance or repair. The device is lightweight and can easily be operated by one person and can be safely carried to an elevated location. Because the device uses simple air pressure, no fumes or environmentally objectionable odors are released. The device provides a simple and yet reliable indication of the precise point of a leak in a metal roof structure so that the leak can be positively identified and repaired. Through the use of the device, a sturdy and watertight metal roof structure can be provided with an assembly method which merely involves the use of mechanical fastening elements rather than the use of more complicated flanged, clip-type designs.

While the invention has been shown in only one of its forms, it is not thus limited but is susceptible to various changes and modifications without departing from the spirit hereof.

What is claimed is:

1. An apparatus for detecting leaks in a metal roof having a plurality of metal roof panels which are secured in position to form a roof structure by mechanical fastening elements, the apparatus comprising:

an elongate tubular stand having a lower extent and an upper extent connected by an internal bore, the lower extent terminating in a bore end opening;

pressurization means communicating with the internal bore for supplying positive pressure or drawing a vacuum on the internal bore;

seal means located within the bore end opening for forming a pressure tight seal about a selected one of the mechanical fastening elements used to secure the metal roof panels;

gauge means communicating with the internal bore for measuring a change in pressure within the internal bore, such pressure change being indicative of a leak present at the mechanical fastening element being tested;

wherein the gauge means includes a pressure gauge located on the exterior of the tubular stand, the gauge being observable by a user during operation of the hand pump; and a check valve located in the tubular bore between the piston element of the hand operated pump and the pressure gauge.

2. An apparatus for detecting leaks in a metal roof having a plurality of metal roof panels which are secured in position to form a roof structure by mechanical fastening elements, the apparatus comprising:

an elongate tubular stand having a lower extent and an upper extent connected by an internal bore, the lower extent terminating in a bore end opening;

pressurization means communicating with the internal bore for supplying positive pressure or drawing a vacuum on the internal bore;

seal means located within the bore end opening for forming a pressure tight seal about a selected one of the mechanical fastening elements used to secure the metal roof panels;

gauge means communicating with the internal bore for measuring a change in pressure within the internal bore, such pressure change being indicative of a leak present at the mechanical fastening element being tested; and wherein the pressurization means is capable of providing between 1 to 5 psi pressure to the seal means when the seal means is engaged with a selected mechanical fastening element.

3. An apparatus for detecting leaks in a metal roof having a plurality of metal roof panels with overlapping seams which are secured in position to form a roof structure by metal screws having exposed screw heads, the apparatus comprising:

an elongate tubular stand having a lower extent and an upper extent connected by an internal bore, the lower extent terminating in a bore end opening;

a hand operated pump connected to the upper extent of the tubular stand, the hand pump having a piston element located within the internal bore at the upper extent of the tubular stand for supplying positive pressure or drawing a vacuum on the internal bore;

seal means located within the bore end opening for forming a pressure tight seal about a selected one of the exposed screw heads located on the metal roof structure, the seal means comprising an elastomeric ring located within the bore end opening which is sized to surround and make sealing contact with the exposed screw head;

an external pressure gauge located on the exterior of the tubular stand and communicating with the internal bore for measuring a change in pressure within the internal bore, such pressure change being indicative of a leak present at the screw head being tested; and wherein the tubular stand includes an elongate upper extent connected to a stirrup shaped region, the stirrup shaped region being, in turn, connected to the lower extent of the tubular stand.

4. An apparatus for detecting leaks in a metal roof having a plurality of metal roof panels with overlapping seams which are secured in position to form a roof structure by metal screws having exposed screw heads, the apparatus comprising:

an elongate tubular stand having a lower extent and an upper extent connected by an internal bore, the lower extent terminating in a bore end opening;

a hand operated pump connected to the upper extent of the tubular stand, the hand pump having a piston element located within the internal bore at the upper extent of the tubular stand for supplying positive pressure or drawing a vacuum on the internal bore;

seal means located within the bore end opening for forming a pressure tight seal about a selected one of the exposed screw heads located on the metal roof structure, the seal means comprising an elastomeric ring located within the bore end opening which is sized to surround and make sealing contact with the exposed screw head;

an external pressure gauge located on the exterior of the tubular stand and communicating with the internal bore for measuring a change in pressure within the internal bore, such pressure change being indicative of a leak present at the screw head being tested;

wherein the tubular stand includes an elongate upper extent connected to a stirrup shaped region, the stirrup shaped region being, in turn, connected to the lower extent of the tubular stand; and wherein the stirrup shaped region forms a pair of oppositely arranged arcuate paths which communicate the internal bore of the upper extent with the internal bore of the lower extent of the apparatus.

* * * * *